United States Patent

[11] 3,547,286

[72] Inventor Jean Leblond
Compiegne, France
[21] Appl. No. 740,209
[22] Filed June 26, 1968
[45] Patented Dec. 15, 1970
[73] Assignee Uniroyal Englebert France S.A.
Paris, France
a corporation of France
[32] Priority July 5, 1967
[33] France
[31] No. 113,262

[54] METHOD AND APPARATUS FOR TRANSPORTING LOADS
7 Claims, 13 Drawing Figs.
[52] U.S. Cl. .................................................. 214/89,
198/21, 198/159, 214/152
[51] Int. Cl. ...................................................... B65g 17/46
[50] Field of Search .......................................... 214/89,
16.14D, 152; 198/189, 76, 21, 159

[56] References Cited
UNITED STATES PATENTS
2,619,916 12/1952 Rainier ........................ 198/33.2X
2,652,162 9/1953 Auger .......................... 214/16.1(4D)
2,970,413 2/1961 Miklosek ..................... 214/16.14(D)
3,057,487 11/1962 Martinez ..................... 214/16.1(4D)

Primary Examiner—Albert J. Makay
Attorney—Charles A. Blank

ABSTRACT: Apparatus for transporting loads, for example, tire tread material includes means for transporting a loaded support along one directional axis. The apparatus also includes means for transporting the loaded support along another directional axis normal to the first-mentioned axis to a position at which the support is unloaded. The two transport means are effective to return the unloaded support to the starting position of the support.

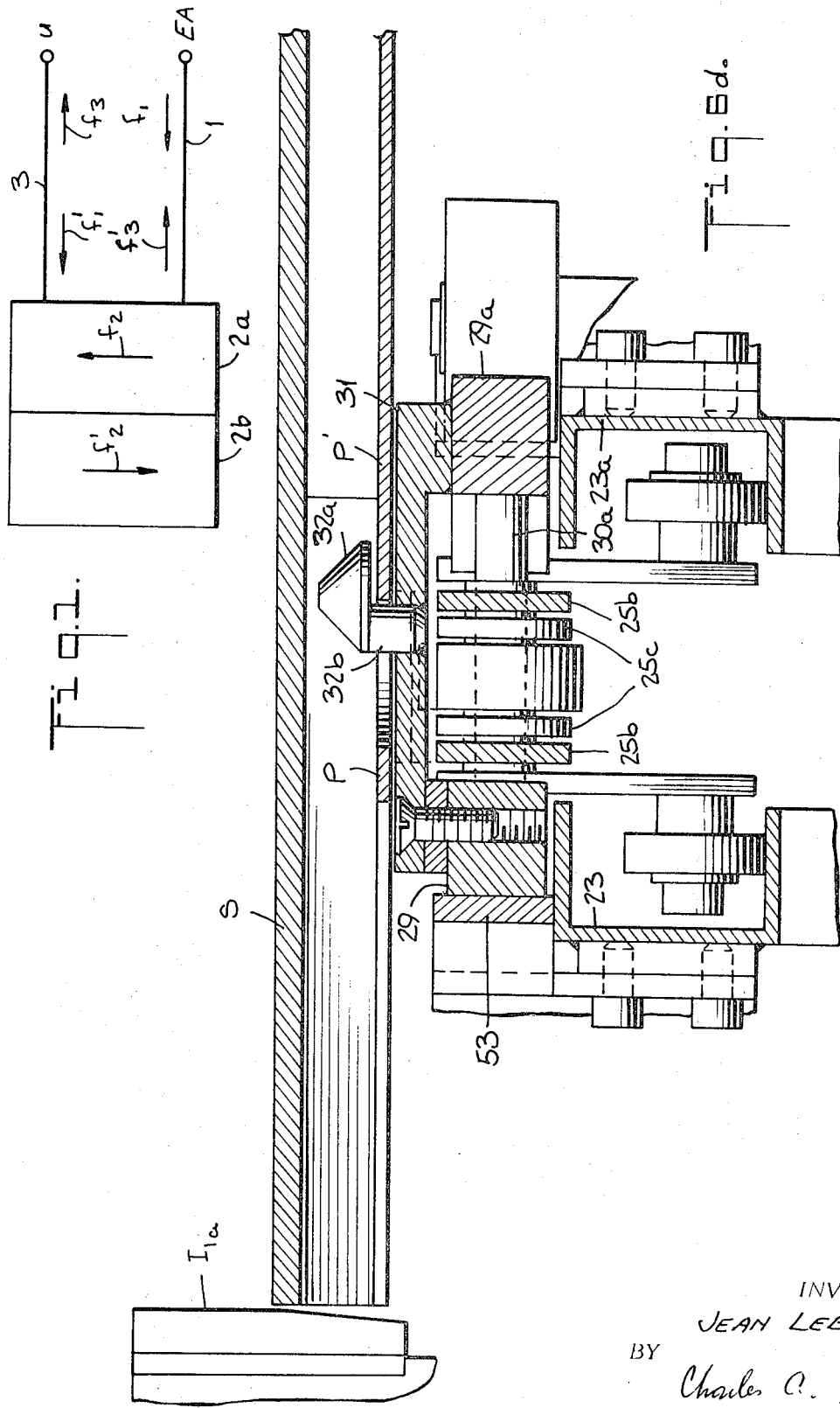

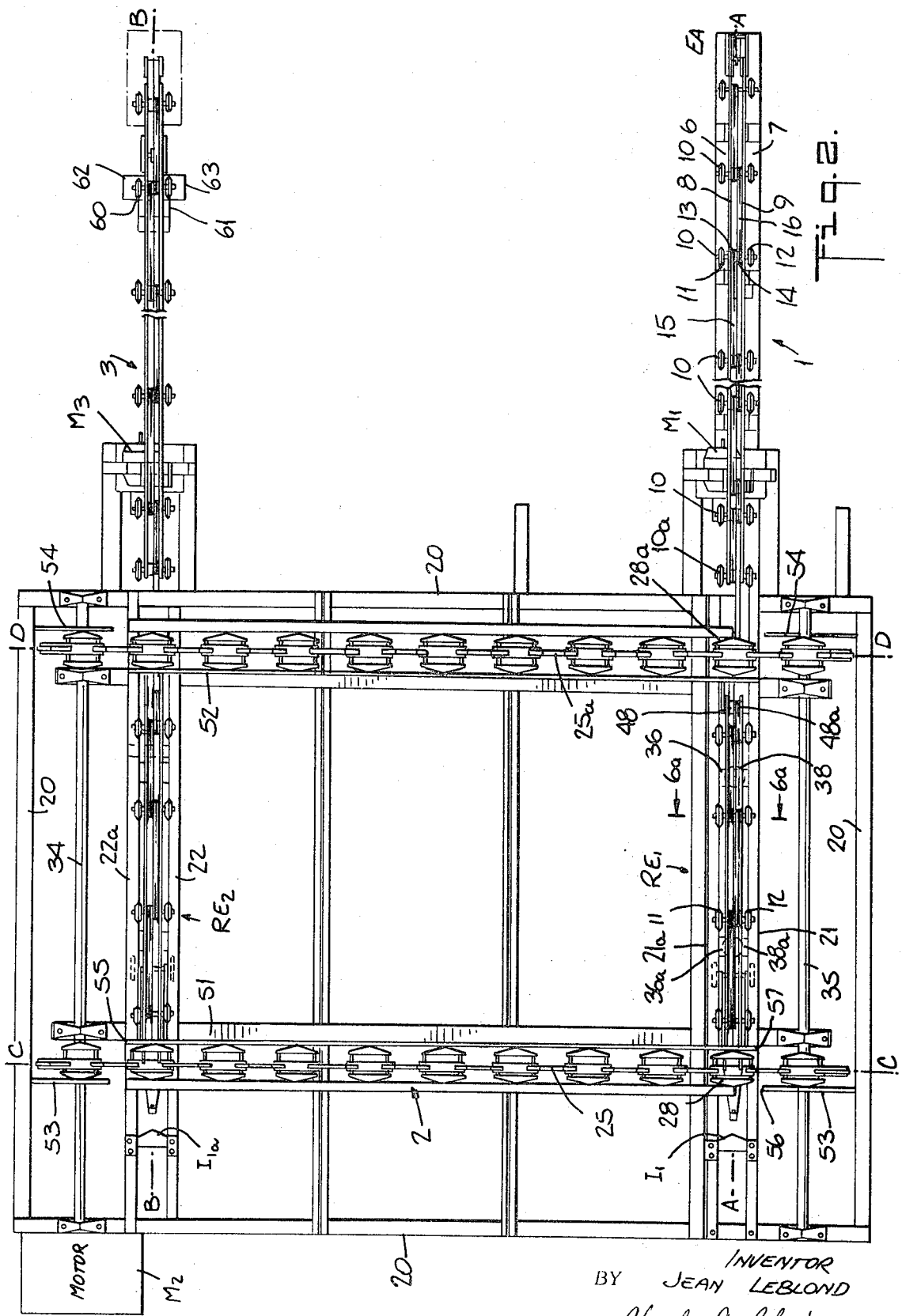

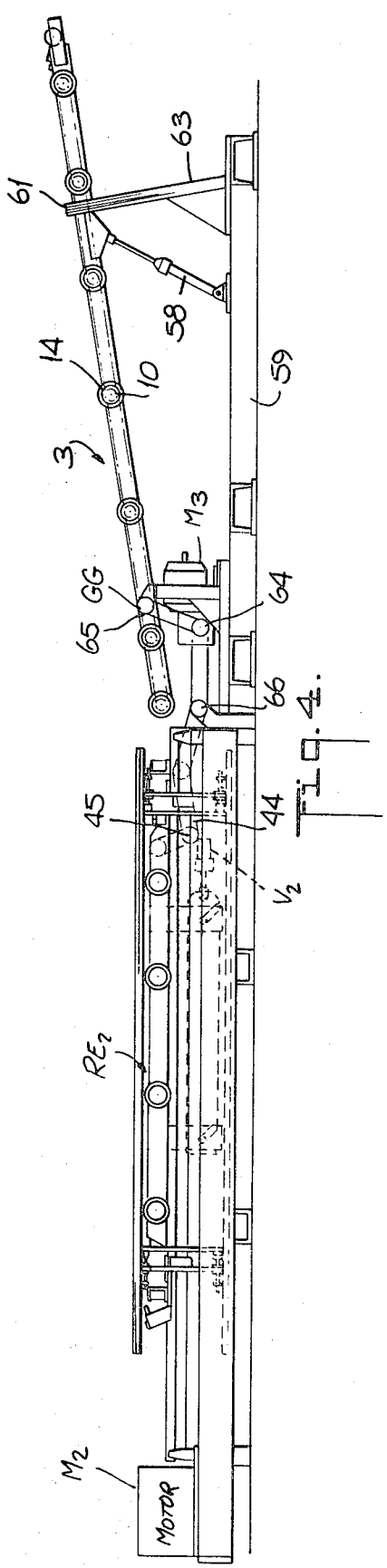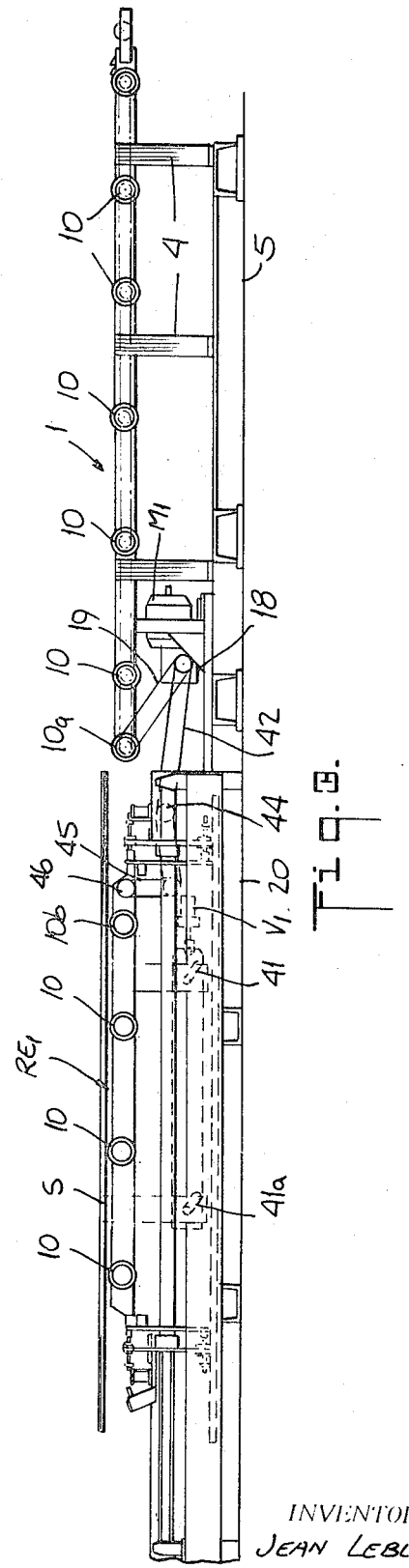

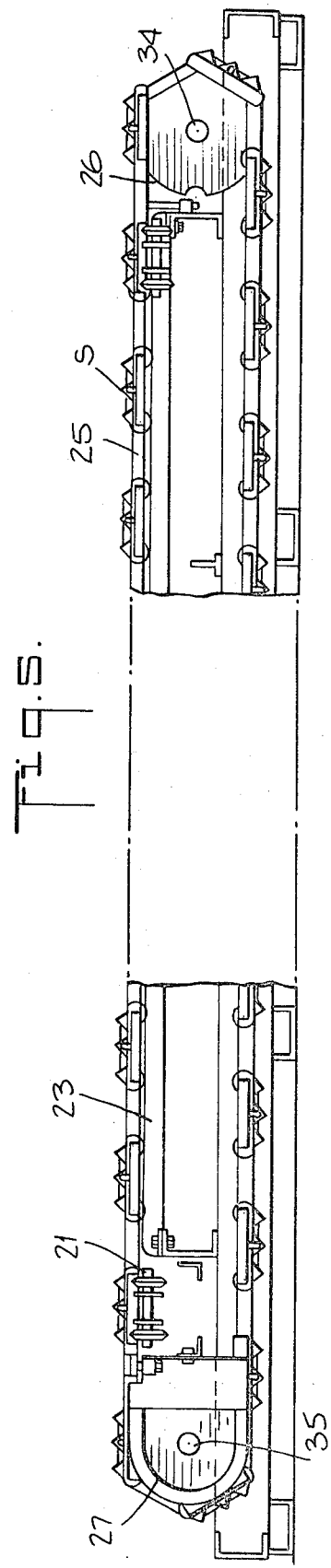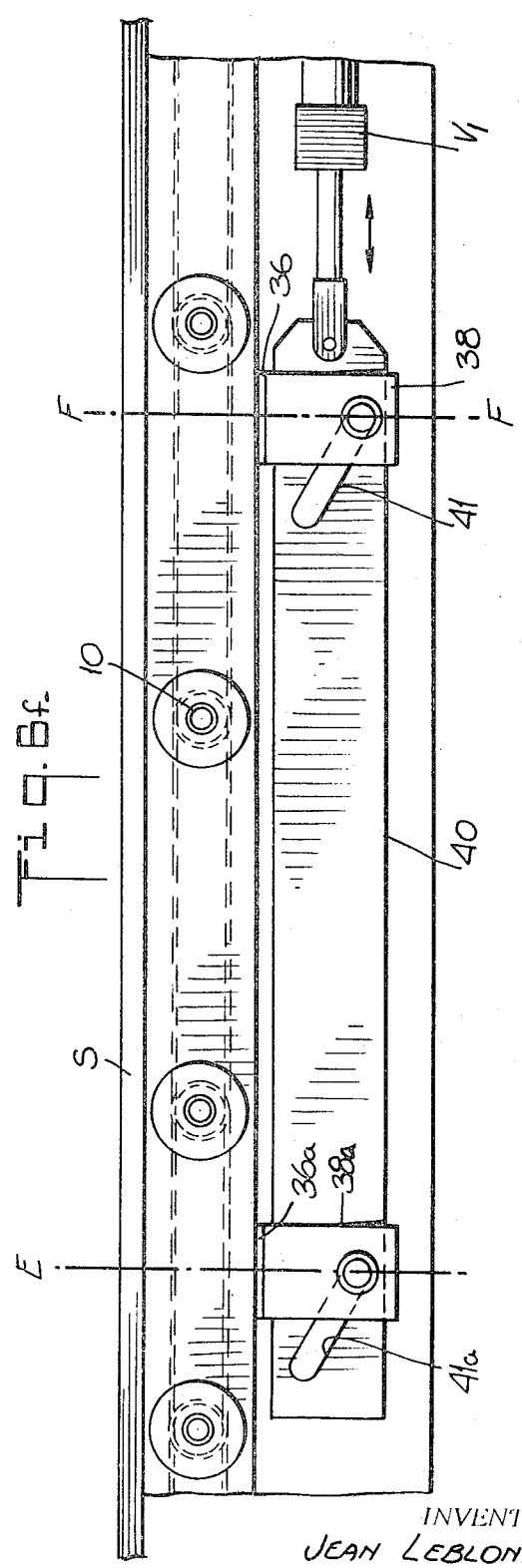

INVENTOR.
JEAN LEBLOND
BY Charles A. Black
ATTORNEY

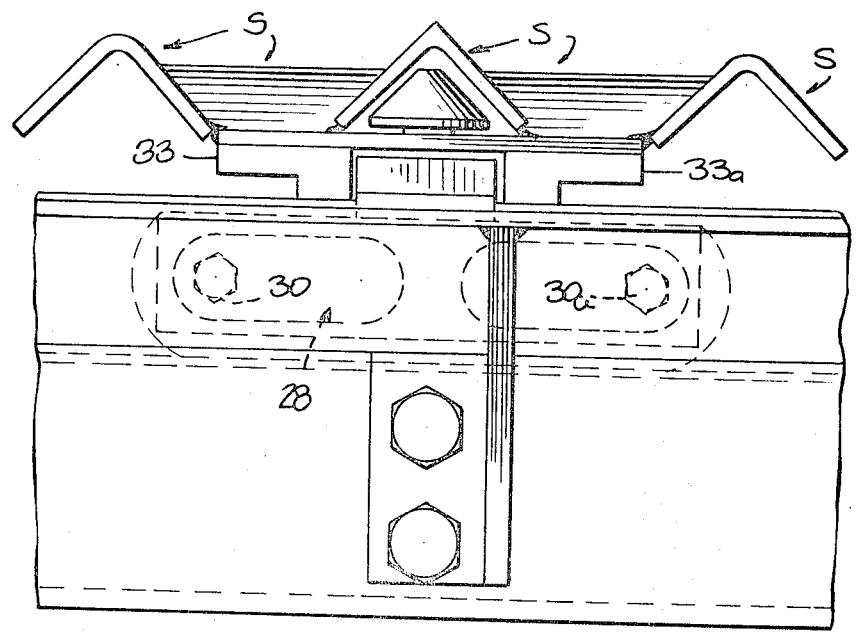
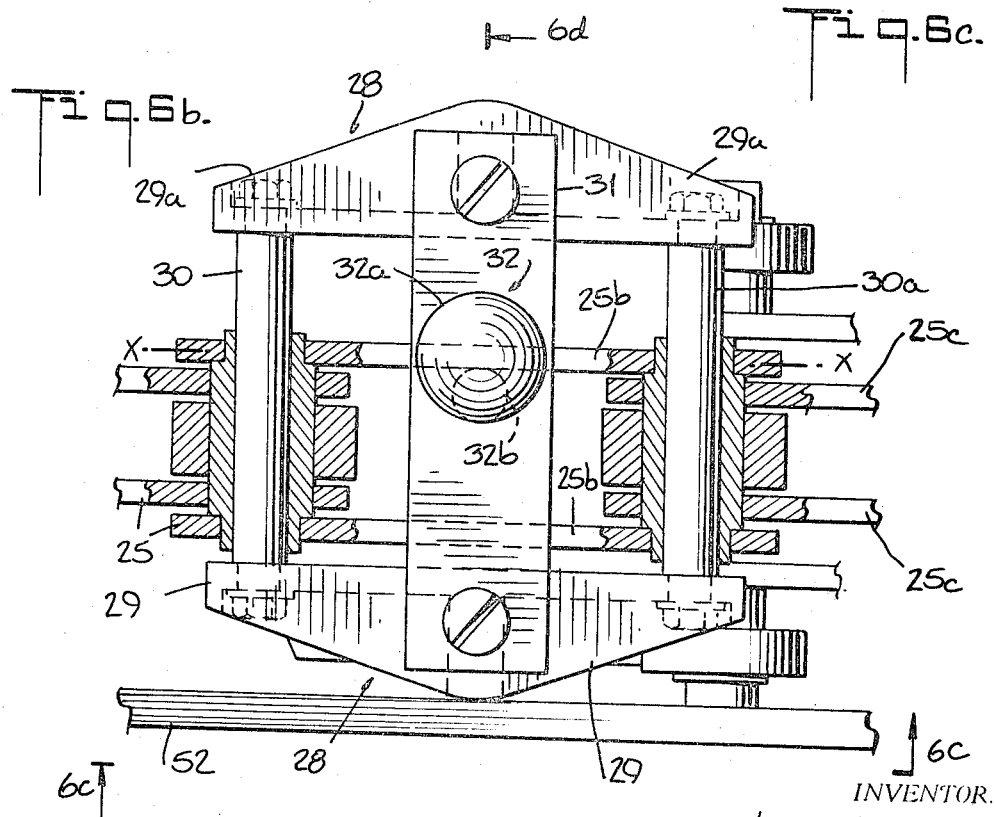

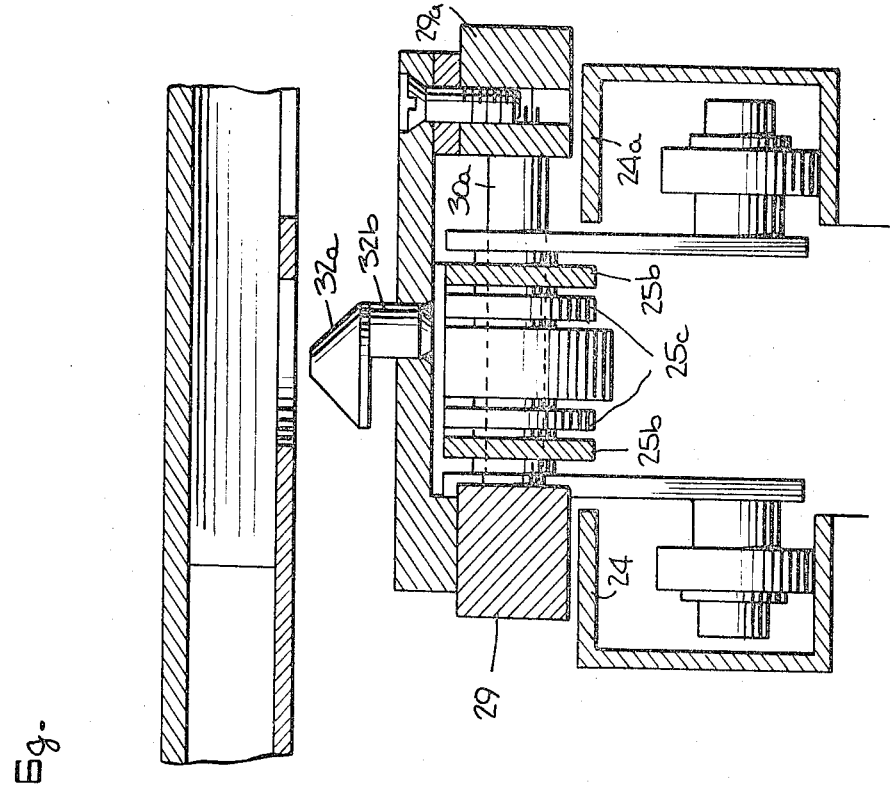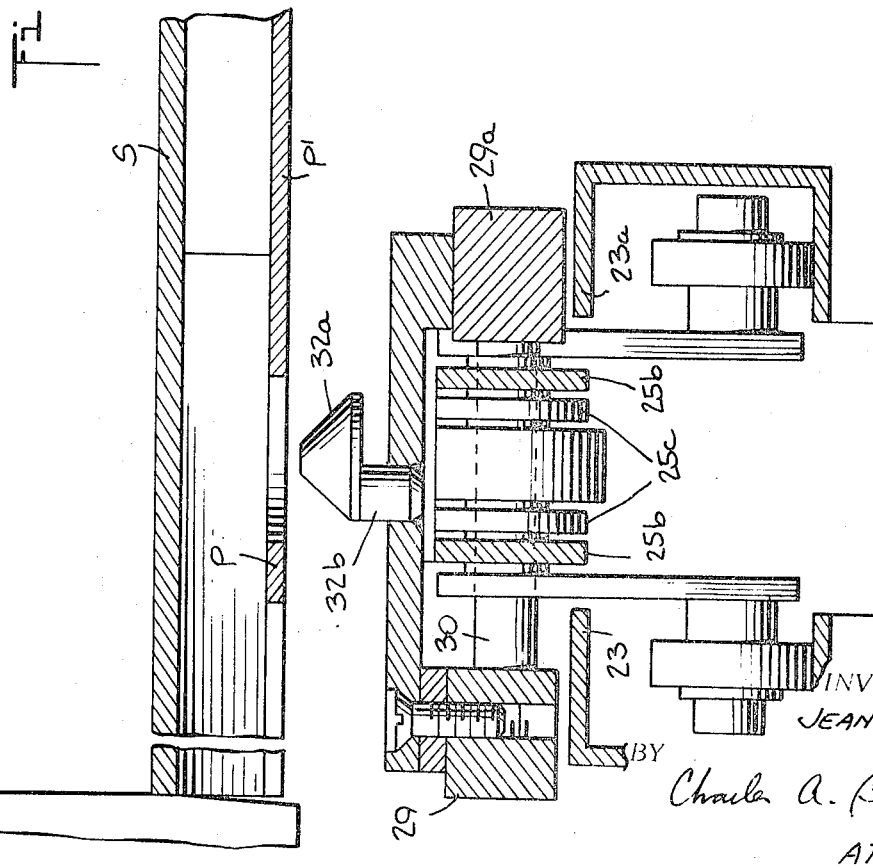

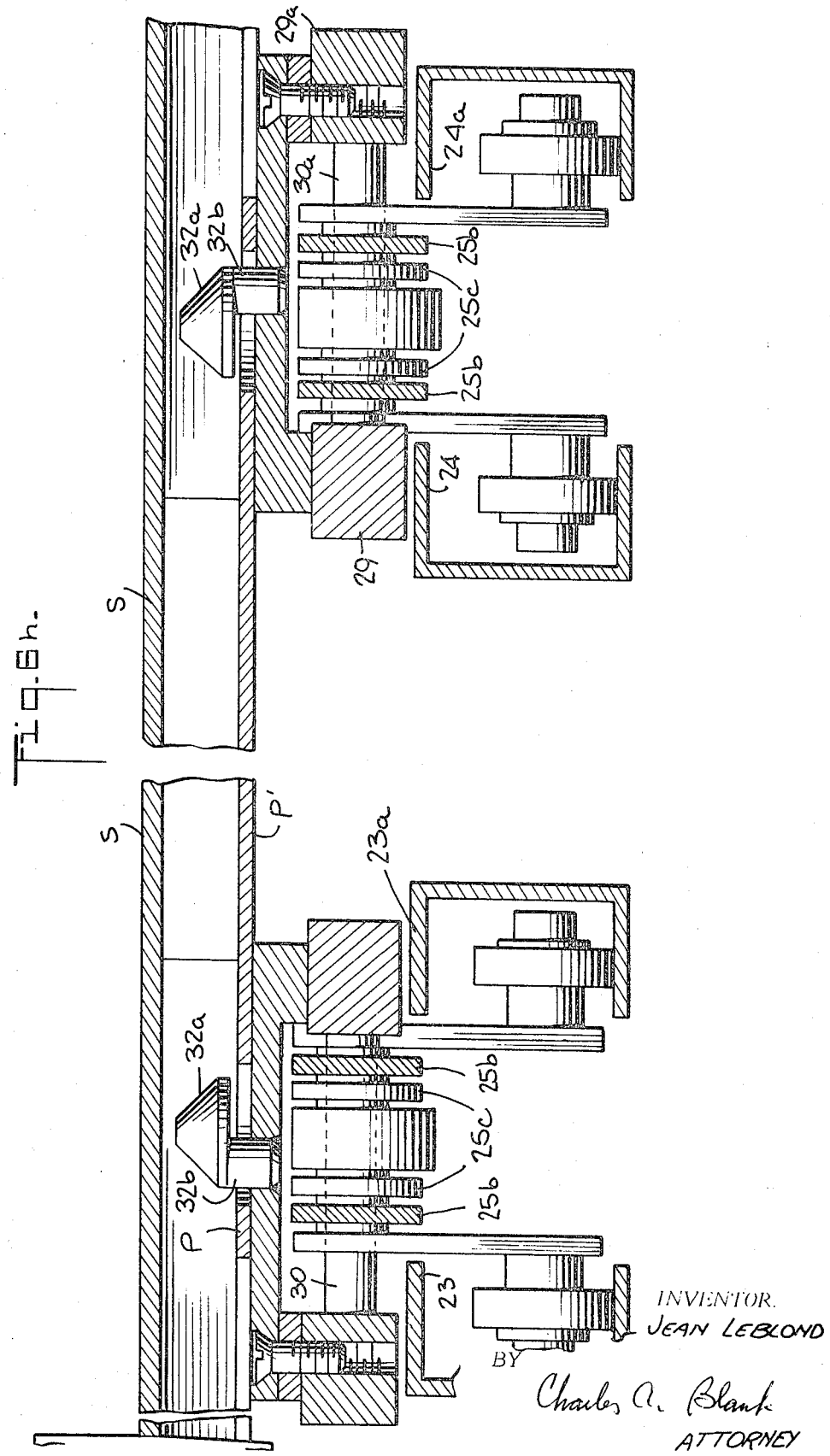

METHOD AND APPARATUS FOR TRANSPORTING LOADS

The present invention relates to a method of transporting loads, preferably, at regular intervals of time, between two points, especially points separated by an obstacle. It likewise relates to apparatus for transporting loads and is particularly applicable to a unit for building tire carcasses.

For example, in circumstances where different sets of apparatus are caused to operate during different phases of the building of a complete tire carcass and are combined together to interact, obstructions or available surface areas sometimes cause the adoption of certain relative arrangements of sets of apparatus. Such relative arrangements between certain of these sets of apparatus, though favorable in certain respects, either make it impossible or impractical to use known equipment, or else cause certain operations to be carried out manually, which causes the loss of a substantial part of the advantages otherwise gained. Thus, for example, when a building drum for tire carcasses is used, the different elements constituting the carcass, such as the successive plies and the tread, should be presented to the drum in such a way that their plane of symmetry, or more generally a plane parallel to the latter, coincides with the median plane of the drum. In other words, these elements should be presented successively and at given instants to the building drum and in predetermined positions. It is understood, therefore, that it is not always possible to arrange the apparatus insuring the supply and transportation of the different constituent parts of the carcass in such a way as to bring them all directly up to the building drum in a position for use. Some of these should be brought in a position for use from a supply point, beyond which certain groups of elements should be turned around.

The present invention brings a solution to this problem by supplying a method and corresponding apparatus for transporting between two positions, especially positions separated by an obstacle, parts going into the tire carcass building cycle at a predetermined moment of the cycle, and which should be presented to the apparatus using them in a given position.

In accordance with a preferred from of the invention, apparatus for transporting loads comprises means at a starting position for supporting a load and one transporting means for transporting said supporting means along one predetermined directional axis. The apparatus includes other transport means for transporting the supporting means along another predetermined directional axis normal to said one predetermined axis to a position at which the supporting means is unloaded. The above-mentioned transport means are effective to return the unloaded support to the starting position of the support.

Also in accordance with a preferred form of the invention, two parallel transport axes are situated on both sides of an obstacle to be avoided.

It is an object of the present invention to provide a new and improved method and apparatus for transporting loads in which at least one loaded support and at least one empty support run through portions of their respective cycles at the same time.

It is another object of the invention to provide a new and improved method and apparatus which achieve the simultaneity of the two cycles of loaded and unloaded supports, respectively, in opposite directions during the translational motion perpendicular to the above-mentioned two parallel axes.

Apparatus according to the invention also has the following features and advantages:

two parallel ramps are equipped with driving rollers with a reversible movement, connected transversely at one of their ends by an endless conveyor, and on which the supports of the loads to be transported are moved in the direction corresponding to their loaded or unloaded state;

the transverse endless conveyor always turns in the same direction;

the conveyor has locking elements for the unloaded supports which are translated by its lower part;

the translational motion of the endless conveyor is conditioned by the presence of a loaded support at one of its ends and an unloaded support at the other end by means of control elements;

the translational motion of the endless conveyor is achieved in a discontinuous manner corresponding to the appearance of the successive supports in extensions of the parallel ramps;

each of the parallel ramps is extended along its axis on the transverse conveyor by a ramp of the same type which is capable of being raised and lowered by a regulated movement in the presence of a support and the rollers of which are driven in a movement synchronized with the movement of the rollers of the above-mentioned parallel ramps;

It is advantageous for the ramp leading to the position where the transported part is used to be equipped with a control element controlling its inclination.

Other characteristics and advantages of the present invention will be made clearer by the description below, made with reference to the attached drawings, in which:

FIG. 1 is a diagram illustrating the method of the invention;

FIG. 2 is an overall plan view of the different elements of the apparatus according to the invention;

FIG. 3 is a sectional view of the FIG. 2 apparatus taken along the axis A–A;

FIG. 4 shows a sectional view of the FIG. 2 apparatus taken along the axis B–B;

FIG. 5 shows a sectional view of a portion of the FIG. 2 apparatus taken along the axis C–C;

FIG. 6b is a fragmentary plan view, to an enlarged scale and partly in section, of a bolt 28 and its connection with a chain link, with support S omitted;

FIG. 6c is a side view of the FIG. 6b apparatus, taken along line 6c–6c of FIG. 6b, with S;

FIG. 6d is a sectional view, to an enlarged scale, of a portion of the FIG. 2 apparatus taken along line 6d–6d of FIG. 6b;

FIG. 6f is an elevational view, to an enlarged scale, of a portion of elevating ramp RE;

FIGS. 6g and 6h are sectional views, to an enlarged scale, of portions of the apparatus for locking the support to a bolt.

Referring to FIG. 1, a loaded support (not shown) is transported first of all on the axis 1 from the point EA, in the direction of the arrow $f_1$, to a transverse translation zone 2a, along which the loaded support is moved in the direction of the arrow $f_2$, then to the point U on the axis 3 in the direction of the arrow $f_3$. The support unloaded at point U is then transported in the opposite direction to the point EA, in the direction of the arrows $f'_1$, $f'_2$, and $f'_3$, respectively, through the transverse translation zone 2b. It is thus possible to cause a loaded support to travel the path $f_2$, and an unloaded support the path $f'_2$, both at the same time.

A preferred embodiment of apparatus according to the invention is represented in FIG. 2, and conforms to the diagram of FIG. 1. Such apparatus is applicable, for example, to a building train for tire carcasses, particularly for transporting treads BR (see FIG. 6a) of a predetermined shape and length from a position EA where they are supplied to a point of use U where they are presented at a given instant in a given position. In this case the treads are supplied at EA on supports S, all similar, at a rate of one per support.

Figure 6A:
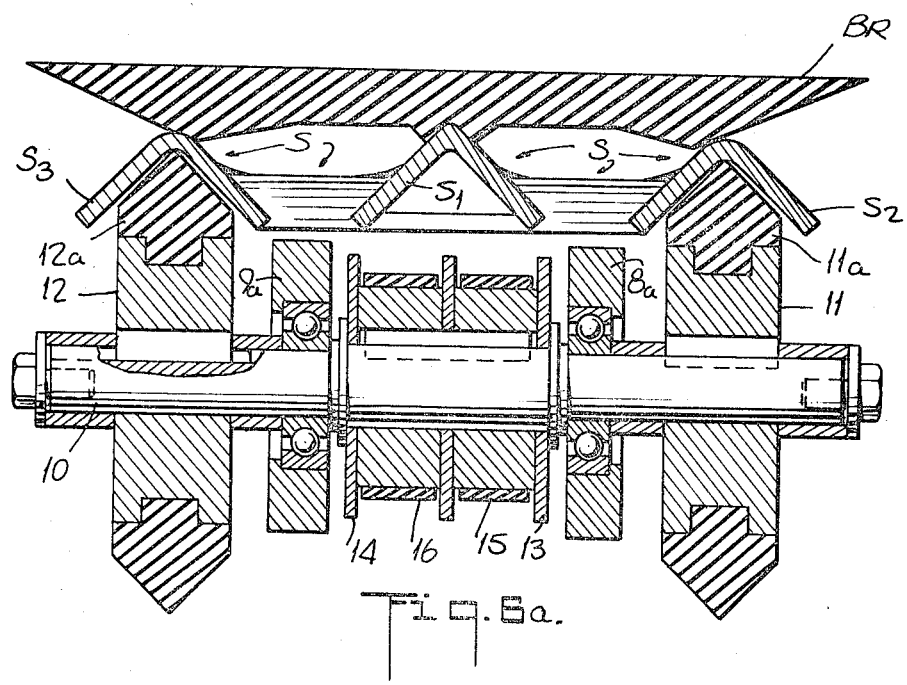
FIG. 6a is a sectional view, to an enlarged scale, of a portion of the FIG. 2 apparatus taken along line 6a–6a of FIG. 2, with support S represented in section.

Referring to FIGS. 6a and 6c in which are shown, among others, cross-sectional and side views, respectively, of a support S consisting of a set of three interconnected sections of angle irons with the same length, with the same general orientation, and the respective terminal cross sections of which are situated in the same plane. These three sections of support S are divided into a median section S1 and two lateral sections S2 and S3 which are similar and symmetrical with one another with respect to the plane of symmetry of the median section and are made integral with one another by essentially known means in two positions respectively equidistant from each of their ends. Likewise, referring to FIGS. 6b, 6c, 6d, at the same distance from the ends of the support, are attached two groups of two parallel small plates p and p' connecting the ends of the inner sides of the two lateral angle irons as shown in FIG. 6c, and separated by a gap whose length and position will be defined further on.

On each support S is placed a tread BR cut to a predetermined length, having a cross section as shown in FIG. 6a. The tread BR, which has a median longitudinal plane of symmetry, has on its outer face a cutout whose shape fits that of the right-angle dihedral of the central support. The longitudinal median planes of the support S and tread BR coincide, the tread BR thus being centered by the support S and the side edges of the tread then resting on the edges of the lateral sections of the support.

Referring to FIG. 2, the unit includes:
  a conveyor ramp 1 for transporting support S, oriented along the axis A-A for transporting the latter, one by one, along the direction of axis A-A, which is that of their length, when they have been placed there, and either in one direction or in the other;
  a conveyor 2 with endless chains receiving the supports S brought by the ramp 1 to translate them transversely along the direction of axis C-C in a single direction and up to a position in which the axis of support S, which is also that of the tread carried, coincides with the axis B-B;
  a conveyor ramp 3 for transporting supports S oriented along axis B-B, that is parallel to A-A and perpendicular to C-C, similar to the ramp 1, for transporting the supports S one by one from the conveyor 2 to the point of use U and vice versa, along the direction of axis B-B which is along that of their length.

Referring now to FIGS. 2, 3 and 6a, the ramp 1, mounted on supports 4 resting on the frame 5, consists of two similar angle irons arranged symmetrically with respect to the axis A-A, their sides 6 and 7 being in the same horizontal plane, and their sides 8 and 9 being vertical and parallel to the plane of symmetry through axis A-A. The sides 8 and 9 support regularly spaced rollers which are mounted for rotation and which are symmetrical with respect to the plane of symmetry through axis A-A, such as rollers 11 and 12. The sides 8 and 9 also support two toothed pinions likewise symmetrical with respect to the plane of symmetry through axis A-A, such as pinions 13 and 14, and integral with one another.

Referring to FIG. 6a, vertical sides 8a and 9a, corresponding to sides 8 and 9 of FIG. 2, support shaft 10 on which rollers 11 and 12 are mounted. The rollers 11 and 12 are equipped with rings 11a and 12a whose profile fits that of the faces of the lateral angle irons of the supports S when the latter are placed on the said rollers as indicated in 6a. These rings are made of an elastic material having a high coefficient of friction, such as rubber, for example.

These rollers 11 and 12 are preferably placed on the outsides of the vertical sides of the angle irons while the toothed pinions 13 and 14 are preferably placed between the sides of the angle irons. The rollers 11 have a common equatorial place parallel to axis A-A, or in other words are lined up with respect to one another, the same is true for the rollers 12. In the same way, the pinions 13 are lined up with one another, and likewise the pinions 14. The pinions 13 are lined up with one another and are connected to one another in groups of two successive pinions by endless belts, each belt 15 having an inner toothed face meshing with the pinions, as indicated in FIG. 2 and in FIG. 6a. The pinions 14 are likewise connected by endless belts 16 with a toothed inner face in groups of two successive pinions in such a way that the belts 15 and 16 are in a staggered arrangement, as represented in FIG. 2.

A motor reducer unit $M_1$, drives a toothed pinion 18 (FIG. 3) in rotation at a suitable speed, the motion of which is transmitted by means of an endless belt 19 with a toothed inner face to one of the pinions 14, the one which is on the outermost shaft 10a, for example. Setting this pinion 14 into rotation drives the corresponding shaft 10a in rotation, and thus the rotation of the corresponding pinion 13. The latter pinion 13 drives the rotation of the pinion 13 on the following axis 10, and that of the pinion 14 on this same axis, and so on. In this way, by means of the endless belts connecting the pinions 13 on the one hand and the pinions 14 on the other hand, as indicated above, pinions on all the axes 10 are set into rotation in the same direction. Consequently, all the rollers 11 and all the rollers 12 of ramp 1 are likewise set in rotation in the same direction and at the same speed. Then if one of the supports S is placed on the ramp 1 in such a way that it rests on a certain number of rollers 11 and 12, as shown in section in FIG. 6a, this support will be driven in translational motion along the axis of the conveyor in one direction or the other, in accordance with the rotation of the rollers 11, 12 in one direction or in the other.

Referring now to FIGS. 2, 3, 4, 5 and 6h, the conveyor 2 is a conveyor of the endless chain type, consisting of a rectangular frame 20 on two transverse and horizontal elements 21 and 22 on which are fastened, in the longitudinal direction, roller tracks 23, 23a and 24, 24a. Each group of 23, 23a and 24, 24a of two U-shaped channel irons is arranged as indicated in FIGS. 2 and 3 with two upper roller tracks 23 and 23a parallel to one another and two lower tracks parallel to one another, these upper and lower tracks being respectively connected by curved tracks of the same formation. The transverse elements 21 and 22 are placed respectively in such a way as to be symmetrical with respect to A-A and to B-B as defined above.

The roller tracks 23 and 24 on the one hand and 23a and 24a on the other serve as guides, respectively, to the links, of appropriate shape, of the endless chains 25 and 25a of an essentially known type. The return of the chains is assured by similar pulleys, placed at each of the ends of the roller track, such as those 26 and 27 shown in FIG. 5. Regularly spaced in the appropriate links of the said chains, at each chain pitch, are placed locking devices the usefulness of which will appear further on, and which consist of similar parts such as 28 and 28a with which they are integral but which nonetheless can be shifted transversely with respect to the chains, as pointed out below.

Referring in succession to FIG. 6b which shows a plan view, partly in section, of a bolt 28 and its connection with a chain link and FIG. 6c which represents a side view taken along the line 6c-6c of FIG. 6b, a bolt 28 consists of two similar lateral flanges. One outer flange 29, and the other inner flange 29a are arranged facing one another as indicated in FIG. 6b. Each of the flanges 29, 29a has the shape of a frustum of a right prism enclosed between two parallel cross sections which are essentially triangular and show two slightly rounded median vertical edges along axis 6d-6d. One of the rounded edges is on flange 29a on the inner side of the conveyor 2 and other rounded edge is on flange 29 on the outer side of the conveyor 2. The bolt 28 also includes vertical faces oblique with respect to the longitudinal axis of the chain 25 and turned respectively toward the inside and toward the outside of the said conveyor. The two flanges are joined together, on the one hand along axis 30 and 30a serving as connecting axis between the links 25b and 25c of the chain which can slide longitudinally in their seats, that is in a direction perpendicular to the axis of the chain 25. On the other hand the two flanges are joined together by a bar 31 having a longitudinal axis on which is attached, at a suitably chosen point, a latch with conical head 32 of which line X-X of FIG. 6b constitutes the plane of symmetry. Referring to FIG. 6d, this latch 32 consists of a head 32a in the form of a right cone of revolution attached by part of its base, whose plane is parallel to the upper plane of the bar 31, onto a cylindrical part 32b inserted in the bar 31. The diameter of cylindrical part 32b is less than about half of that of the base of the cone. There is between the base of the cone and the bar 31 a gap with uniform thickness which, allowing for a slight play, is equal to the thickness of the small plates $p$ and $p'$ fastened onto the supports S mentioned above. Finally, small plates 33 and 33a (shown in FIG. 6c but not shown in FIG. 6b and not visible in FIG. 6d) are fastened onto the link 25b. The bar 31 may slide between plates 33 and 33a while the axes 30 and 30a slide in their seats. On the upper face of plates 33 and 33a, joined with the upper face of the bar 31, the plates $p$ and $p'$ of the supports S rest in the manner indicated later in connection with the functioning of the bolts 28.

The endless chains 25 and 25a are set in motion by means of a pneumatic drive unit $M_2$ which is regulated step by step with the movements of the support S on the ramps and which directly drives the pulley 26 (shown in FIG. 5). The pulley 26, placed along axis C-C of FIG. 2 and connected by the endless chain 25 to the pulley 27, drives the pulley 27 by means of the chain. The corresponding pulleys of the roller track placed on the axis D-D are respectively connected to the pulleys 26 and 27 by the shafts 34 and 35 with which they are integral. The result of this is that these pulleys are then driven in rotation while the pulley 26 is itself driven in rotation, which has the effect of setting the chain 25a in motion integrally with the chain 25.

Placed along the axis A-A, as in the extension of the ramp 1 between the endless chains 25 and 25a, is situated an elevating ramp $RE_1$, which is similar in principle and operation to the ramp 1. The shafts 10 of the rollers 11 and 12 and of the pinions 13 and 14 are mounted on parallel supports 8a and 9a, playing the same part as the vertical sides of the angle irons supporting these shafts on the ramp 1.

Figure 6E:
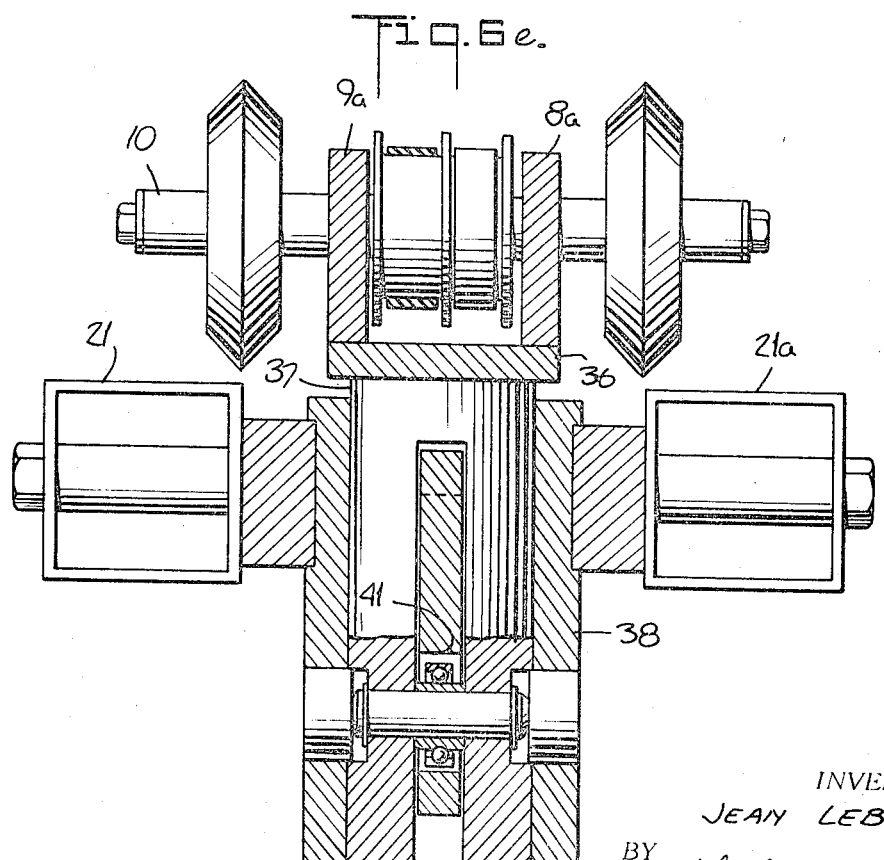
FIG. 6e is a diagrammatic cross section of elevating ramp RE, along the axis E–E of FIG. 2.

As indicated in FIG. 6e which shows a diagrammatic cross section of the elevating ramp $RE_1$ along the axes E-E and F-F, and in FIG. 6f which shows a longitudinal section of the said ramp on a length slightly greater than the distance between axes E-E and F-F, the parallel and horizontal supports 8a and 9a are joined together integrally, at the position of the axes E-E and F-F, by the transverse plates 36 and 36a constituting the heads of similar pistons 37 and 37a, these pistons being vertically mobile in identical cylinders which are integral with the fixed posts 21 and 21a (or 22 and 22a).

The pistons and cylinders respectively have with respect to one another, and starting in their lower parts, longitudinal openings lined up along the longitudinal axis of the elevating ramp making way for a coupling arm 40. The arm 40, advantageously composed of a flat iron bar with a rectangular right-angle cross section, operates in conjunction with two similar inclined slots 41 and 41a with the same orientation and removed from one another by a translational motion in the direction A-A. This arm is moreover connected with the rod of a jack $V_1$ which transmits to it a translational movement parallel to the axis A-A whether in one direction or the other.

Assuming on the one hand that the pistons 37 and 37a guided by their cylinders can move only vertically and that on the other hand the arm 40 can move only in a horizontal translational motion parallel to the axis A-A, the resulting movement transmitted to the axes of the pistons and consequently to the pistons themselves takes place in the only direction where the forces to which they are subjected are not cancelled by reactions, that is, along their longitudinal axes, or in other words vertically, and takes place due to relative displacements of the ramps and the axes of the pistons. The displacement of the arm by means of the jack $V_1$ then causes either the raising or the lowering of the elevated ramp $RE_1$ integral with the pistons 37 and 37a. In the case of FIG. 6f, the elevating ramp is in its lower position (whereas when the rod of the jack $V_1$ goes into its cylinder, the said ramp is in its upper position).

Referring now to FIGS. 2 and 3, the rollers 11 and 12 of the elevating ramp $RE_1$ are set in rotation by means of the motor reducer unit $M_1$ mentioned above. For this purpose the shaft of the toothed pinion 18 has a second toothed pinion 18a (not shown) which is connected by an endless belt 42 with toothed inner face to a toothed pinion 43 (not shown) carried by a fixed shaft 44, integral with the frame 20 and on which is attached a toothed pinion 43a (not shown). A shaft 45 is linked to fixed shaft 44 so as to be movable with respect to shaft 44 while maintaining a constant center-to-center distance. Likewise, the shaft 45 is linked to shaft 46 so as to be movable with respect to shaft 46 on the elevating conveyor while maintaining a constant center-to-center distance. Shaft 46 is rotatably mounted on supports 8a and 9a of the elevating conveyor $RE_1$. On the shaft 44 is mounted a second toothed pinion 43a (not shown); likewise the toothed pinions 47 and 47a (not shown) on the one hand and the toothed pinions 48 and 48a on the other are mounted respectively on the shafts 45 and 46. Endless belts with a toothed inner face connect the toothed pinions 43a and 47 on the one hand and 47a and 48 on the other. Moreover, the pinion 48a is connected by an endless belt with a toothed inner face to the pinion 14 of a shaft 10b of the elevating ramp $RE_1$. Under these conditions, setting in motion the motor pinion 18 then drives in rotation the toothed pinions of the shaft 10b and consequently drives the rotation of all the axes 10 of the elevating conveyor $RE_1$, and consequently the rotation of the rollers is the same as that of the rollers of the ramp 1. Due to the articulated system consisting of the assembly connecting the axes 44, 45 and 46 to one another, the movements of raising or lowering the elevating ramp $RE_1$ may be carried out without the mechanical connection with the ramp 1 being broken.

Thus if we place on the ramp 1, at the opposite end from the endless chain conveyor 2, a support S resting by its lateral angle irons on the rollers 11 and 12 of the ramp, it will be sent on its way in the direction of the conveyor 2, and if the motor reducer unit $M_1$ and the jack $V_1$ are regulated in such a way that when $M_1$ is in rotation the elevating ramp $RE_1$ is in the high position, the support will be transferred directly from the ramp 1 to the elevating ramp 1 and driven jointly by the two ramps 1 and $RE_1$, then by the ramp $RE_1$ along, until it is put in position on the conveyor 2. Movement in the opposite direction makes it possible to transfer a support in a similar manner from the conveyor 2 to the end of the ramp 1.

When a support has been transferred by the ramp 1 onto the conveyor 2, and it is in position there to be carried transversely, the elevating ramp having been put into the low position in advance, it rests as indicated in FIG. 6h by means of small plates $p$ and $p'$ on the lateral flanges of the bolts 28 and 28a which are lined up along the axis A-A. The latch with a conical head carried by the central junction bar of the two flanges is then placed in the gap separating the two plates $p$ and $p'$. The bolts are driven jointly and respectively by the chains 25 and 25a. The support carried by the said bolts is driven transversely, its axis remaining parallel to the axis A-A and thus being transported from the position corresponding to the axis A-A up to another arbitrarily chosen position such as, for example, the one corresponding to the axis B-B.

When a support transporting a tread BR has been taken onto the conveyor 2 and replaced by an unloaded support, an operation carried out in a manner to be described further on, the unloaded support should be brought to the position corresponding to the axis A-A. Conveying the unloaded support is then done by the conveyor 2, to a major extent by its lower part. Accordingly, the support, which up to now has been described as being only placed on the upper side of the chains, is attached to the lower side of the chains for this part of its path. This attachment is done automatically with the use of the bolts 28 and 28a in the following manner: (a) it is supposed that the direction of travel of the conveyor 2 is from the axis A-A to the axis B-B in its upper part, and that the latter axis B-B is the one from which or in the vicinity of which it is wished to obtain the locking of the support on the chains; (b) the conveyor 2 is equipped on its upper part and between A-A and B-B with two guides 51 and 52 which extend upward the vertical surfaces of the roller tracks turning toward the inside of the conveyor, and on the surfaces of which the lateral flanges of the bolts 28 and 28a respectively are supported along their median vertical edge and are then guided. In this manner, the bolts 28 and 28a retain between A-A and B-B the position shifted apart toward the outside shown in FIG. 2, their outer lateral part going beyond the outer vertical surfaces of the roller track of the chains. The vertical guides 53 and 54 are placed substantially in the extension of these outer vertical surfaces; the guides extend from one end to the other of the upper parts of the roller tracks, each running in the same vertical plane, along the drive pulleys of the chains and along the outer surfaces of the lower parts of these roller tracks.

Under these conditions, a bolt 28 such as the one located at a certain moment along the axis B-B, and when the direction of travel on the upper part of the conveyor 2 is that of A-A to B-B, is guided by the guide 51 to the end 55 of the latter, the median vertical edge of its lateral inner flange remaining in contact with the said guide until its first oblique lateral outer surface comes in contact with the inner vertical surface of the guide 53 and carries it progressively and transversely on the chain, in the direction of the inside of the conveyor, in such a way that it comes to occupy the position shown in FIG. 3, in which the median vertical edge of its outer flange is in contact with the inner vertical surface of the guide 53. The bolt then keeps this position with respect to the chain, which is its closed position, as long as it is guided by the guide 53, that is until the moment when its outer edge reaches the end 56 of the latter. When the bolt 28 has reached this position, its first lateral inner face comes into contact with the end 57 of the guide 51, which, because of the movement of the chain, has the effect of moving it transversely on this chain and of bringing it to occupy its initial position with respect to it, which is its open position. This opening and closing process is obviously the same for all the bolts 28 and for all the bolts 28a.

Referring now more especially to FIGS. 6b, 6c, 6d, 6g, and 6h, each support S as stated above has two groups of two small plates p and p' separated by a certain gap. When it is placed on the conveyor 2 in a conveying position, on the one hand the small plates p and p' rest respectively on the small plates 33 and 33a which they overlap and on the other hand the conical-headed latches 32 carried by the junction bars 31 of the flanges 29 and 29a are in the gap separating the two small plates. The length of this gap, with allowance made for a certain play, is slightly greater than that of the transverse stroke of a bolt. When the two bolts 28 and 28a on which a support rests are in the open position, the apparent contour of the base of the cone constituting the conical head of the catch is entirely inside the gap between the plates p and p', as represented in FIG. 6g. When, on the other hand, they are put in the closed position in the manner indicated above, the base of the conical head is placed on the face of the corresponding small plate p' which is turned toward the edge of the central support angle iron, although the plate is then partially enclosed in the empty gap with a predetermined distance separating the base of the conical head from the junction bar of the two flanges of the bolt. In this condition, as represented in FIG. 6d, the support S is made integral with the bolts 28 and 28a by means of their conical-headed latches and consequently integral with the chains 25 and 25a. It may then be carried by the lower sides of the said chains, since the corresponding bolts there are in the closed position.

Referring now to FIGS. 2 and 4, the conveyor 2 is equipped along its axis B-B with an elevating ramp $RE_2$, similar in all points with the elevating ramp $RE_1$ described above, and placed along the axis A-A.

As an extension of the elevating ramp and oriented with axis B-B, there is placed a ramp 3 similar in all points to the ramp 1 previously described. However, this ramp 3 is made movable within certain limits around a fixed transverse horizontal axis G-G which makes it possible to incline it to the horizontal. For this purpose a pneumatic or hydraulic jack 58 which is articulated on the one hand with the framework 59 serving as a support for the ramp, and on the other hand with the ramp itself, makes it possible to vary its inclination. Guide devices shown as 60 and 61 in FIG. 2, retained by the supports 62 and 63 shown diagrammatically in FIGS. 2 and 4, make it possible to keep it in the same vertical plane while causing its inclination to vary.

The rubber-covered rollers 11 and 12 of this ramp are driven in rotation by a motor reducer unit $M_3$ similar to the motor reducer unit $M_1$. Its motor shaft has two toothed pinions of which pinion 64 drives, by means of an endless belt with toothed inner surface, a toothed pinion 65 mounted on the axis G-G, and the other pinion 64a drives, by means of an endless belt similar to the foregoing, a toothed pinion 66 integral with a fixed axis. On the same axis as the pinion 64 two toothed pinions 64a and 64b (not shown) are mounted and are connected respectively to the pinions 14 and 13 on the axes 10 between which it is placed, by endless belts with a toothed inner surface. For this reason, when the motor pinion 64 is driven in rotation, the rubber-covered rollers of the ramp 3 are also. On the axis which carries the pinion 66 is also mounted a pinion 66a (not shown) which plays the same part as the pinion 18 mentioned above in connection with the elevating ramp RE 1, and starting from the rollers of the elevating ramp $RE_2$ are set in rotation by means of a device the same as that previously described for the elevating ramp $RE_1$.

Referring now to FIGS. 2, 3, 4 and 5, the apparatus described above, applied, for example, to conveying treads BR of the tire casings from a supply position EA to a position of use U, are used and function in the following manner:

At EA the treads BR are stored and already in place on their supports, generally longer than the treads. In the case of the example chosen, the treads BR in cross section have the shape shown in FIG. 6a and are placed on their supports as stated above.

It is supposed in the following that the conveyor 2 in the case of FIGS. 2 and 5 has endless chains each having links carrying bolts, regularly spaced, and that supports S are in place on the conveyor. Of the supports, several are loaded ones between the axes A-A and B-B on its upper part, simply placed on their bolts (the positions corresponding to the said axes do not have supports). The other supports, empty ones, are locked by the corresponding bolts. Moreover, it is supposed that at the initial moment, the following conditions are fulfilled:

a support loaded with a tread BR has been placed on the ramp 1 at its end EA;
a support, empty, is situated on the ramp 3 at its end U;
the conveyor 2 is stopped;
the elevating ramps $RE_1$ and $RE_2$ are in the high position;
apparatus of the usual type, which may or may not have automatic electric and electropneumatic controlling elements, makes it possible to regulate the different motor elements of the apparatus to cause the necessary movements as well as their synchronization, their succession or their stopping.

Under these conditions, starting the motor reducer units $M_1$ and $M_3$ in motion "forward" drives the functioning of the ramps 1 and 3, and consequently that of the elevating ramps $RE_1$ and $RE_2$, and hence the translational motion of the supports placed on them, in the direction going toward the conveyor 2. The elevating ramps are then at the same level as the corresponding ramps 1, 3 and in their respective extensions the supports each go from the ramps 1, 3 to the corresponding elevating ramps until they rest entirely on the rollers of these latter. This position is attained when the front end of the support in the direction of its travel touches and actuates one of a pair of limit switches $I_1$, $I_{1a}$ on a beam of the framework of the conveyor 2. The limit switch $I_1$ or $I_{1a}$ actuates the stopping of the motor reducer unit $M_1$ or $M_3$ and the action of the corresponding jack $V_1$ or $V_2$; respectively. The ramps 1 and 3 are then stopped the same as the corresponding elevating ramps $RE_1$ and $RE_2$. The elevating ramps $RE_1$ and $RE_2$ have then been brought to a low position and the corresponding supports are no longer supported except by the corresponding bolts 28 and 28a.

When the two elevating ramps $RE_1$ and $RE_2$ are lowered and the limit switches which they actuate are simultaneously in the same position, the motor unit $M_2$ of the conveyor goes into action step by step. This unit $M_2$ is equipped with an automatic controlling element which is essentially known, which on the one hand commands its stopping when the chains have run through a distance equal to that of one chain pitch, that is, particularly when the loaded support which initially preceded the axis B–B has been put on this axis and when the empty support which initially preceded the axis A–A has been placed on this axis, after being automatically unlocked. On the other hand the automatic controlling element actuates the action of the jacks $V_1$ and $V_2$, for putting the elevating ramps in the high position, then actuates the "rear" action of the motor reducer units, and thus the driving of the elevating ramps and the corresponding ramps. Consequently there occurs the simultaneous translational movement, out of the conveyor 2, of the loaded support placed on the axis B–B, toward U, and of the empty support placed on the axis A–A, toward EA.

When the empty support reaches the end of the conveyor 1, it actuates a limit switch controlling the stopping of the unit $M_1$. The support may then be moved out from the ramp and either be replaced by a loaded support or be loaded directly. Likewise, when the loaded support reaches the end of the ramp 3, it actuates a limit switch controlling the stopping of the unit $M_3$ and placed on a stop which keeps the support in the position reached. The jack 58, controlled from the position of use U then brings the ramp 3 to the inclination required for the application of the tread BR onto the receiving element whose plane of symmetry coincides with its own, and during the whole time of the driving of the tread from the support, the central angle iron of the support on which it slides playing the role of a guide for it. Idle coaxial rollers placed at the end of the ramp make it possible to exert on the tread during its application to the receiving element a force whose value can be caused to vary by means of the jacks whose fluid pressure is adjustable at will.

When the operations of applying the tread onto the receiving element are finished, the withdrawal of the jack 58 is controlled by the use of contacts actuated from the position of use U, to bring the ramp back to a horizontal position. In turn, the jack arriving at the limit in the low position actuates a contact controlling the starting of the unit $M_3$ in forward action.

The apparatus is then in the initial position and a new cycle can then commence.

The apparatus and the method described may naturally be the object of numerous modifications remaining within the scope of the invention. Thus, for example, the ramps 1 and 3 may if necessary be located on both sides of the conveyor 2. Also, moreover, the conveyor 2 may, if necessary, even be supplied with supports placed directly on the elevational ramp $RE_1$, thereby eliminating the ramp 1.

While there have been described what at present are believed to be the preferred embodiments of this invention, it will be obvious to those skilled in the art that various changes and modifications may be made therein without departing from the invention, and, it is, therefore, aimed to cover all such changes and modifications as fall within the true spirit and scope of the invention.

I claim:

1. Apparatus for transporting loads comprising:
   means at a first position for supporting a load;
   one transport means, comprising endless conveyor means, for transporting said loaded supporting means along one predetermined directional axis and for returning said supporting means, when unloaded, under said conveyor means to said first position;
   other transport means for transporting said loaded supporting means along another predetermined directional axis normal to said one predetermined axis to a position at which said loaded supporting means is unloaded and for transporting said unloaded supporting means to said one transport means; and
   said one transport means also comprising means for locking said unloaded supporting means to said endless conveyor means while said unloaded supporting means is under said conveyor means.

2. Apparatus in accordance with claim 1 in which said locking means includes a latch which is transversely slidable relative to said endless conveyor means for engaging said unloaded supporting means and said locking means and in which said locking means also includes means for engaging and disengaging said latch with said supporting means at selected positions of said latch along said one predetermined axis.

3. Apparatus for transporting loads comprising:
   means at a starting position for supporting a load;
   first transport means for transporting said loaded supporting means along a first predetermined directional axis and for returning said supporting means, when unloaded, to said starting position;
   second transport means, comprising endless conveyor means, for transporting said loaded supporting means along a second predetermined directional axis normal to said first axis and for returning said supporting means, when unloaded, under said conveyor means to said first transport means;
   third transport means for transporting said loaded supporting means along a third predetermined directional axis parallel to said first axis to a position at which said supporting means is unloaded and for returning said unloaded supporting means to said second transport means; and
   said second transport means also comprising means for locking said unloaded supporting means to said endless conveyor means while said unloaded supporting means is under said conveyor means.

4. Apparatus for transporting loads comprising:
   means at a starting position for supporting a load;
   first transport means, including rollers, for transporting said loaded supporting means along a first predetermined directional axis and for returning said supporting means, when unloaded, to said starting position;
   second transport means, including an endless conveyor normal to said first predetermined axis and including first vertically displaceable rollers, for transporting said loaded supporting means along a second predetermined directional axis normal to said first axis and for returning said supporting means, when unloaded, to said first transport means; said second transport means also including means for lowering said first vertically displaceable rollers of said second transport means to place said loaded supporting means on said endless conveyor;
   third transport means for transporting said loaded supporting means along a third predetermined directional axis parallel to said first axis to a position at which said supporting means is unloaded and for returning said unloaded supporting means to said second transport means; and
   said second transport means also including second vertically displaceable rollers for raising said loaded supporting means and for transporting said loaded support means to said third transport means.

5. In tire-building apparatus, apparatus for transporting tire treads comprising:
   means at a starting position for supporting a tire tread load;
   first transport means including rollers for transporting said loaded supporting means from the starting position along a first predetermined directional axis;
   second transport means including first vertically displaceable rollers for positioning said supporting means and including an endless conveyor, lower than said first vertically displaceable rollers thereof, for transporting said loaded supporting means along a predetermined second directional axis;
   said second transport means including means for lowering said first vertically displaceable rollers thereof to a position below said conveyor to place said loaded supporting means on said conveyor;
   said second transport means also including second vertically displaceable rollers lower than said conveyor and means for raising said second vertically displaceable rollers thereof to a position above said conveyor to place said loaded supporting means on said second vertically displaceable rollers;

third transport means including rollers for transporting said loaded supporting means from said second vertically displaceable rollers of said second transport means along a third predetermined directional axis parallel to said first predetermined directional axis to a position at which said supporting means is unloaded;

said third transport means being effective to return said unloaded supporting means to said second vertically displaceable rollers of said second transport means, said second transport means being effective to lower said second vertically displaceable rollers to place said unloaded supporting means on said endless conveyor;

said second transport means including locking means effective to lock said unloaded supporting means to said endless conveyor for the return of said supporting means under said conveyor to a position above said conveyor, said second transport means including means for unlocking said unloaded supporting means above said conveyor and said second transport means being effective to raise said first vertically displaceable rollers thereof to place said unloaded supporting means thereon and to transport said unloaded supporting means to said rollers of said first transport means, said first transport means being effective to return said unloaded supporting means to the starting position.

6. The method of transporting loads comprising:
supporting a load on a support member at a first position;
transporting said loaded support member over an endless conveyor along one predetermined directional axis;
transporting said loaded support member along another predetermined directional axis normal to said one predetermined axis to a position at which said loaded support member may be unloaded;
unloading said loaded support member;
transporting said unloaded support member to said endless conveyor;
returning said support member, when unloaded, under said conveyor to said first position; and
locking said unloaded support member to said endless conveyor while said unloaded support member is under said conveyor.

7. The method of transporting loads comprising:
supporting a load on a support member at a starting position;
transporting said loaded support member along a first predetermined directional axis;
lowering said loaded support member onto an endless conveyor;
transporting said loaded support member over said endless conveyor along a second predetermined directional axis normal to said first axis to a position at which said loaded support member may be raised from said endless conveyor;
raising said loaded support member from said endless conveyor;
transporting said raised support member along a third predetermined directional axis parallel to said first axis to a position at which said support member may be unloaded;
unloading said loaded support member;
transporting said unloaded support member to said endless conveyor;
lowering said unloaded support member onto said endless conveyor;
transporting said unloaded support member to said first predetermined directional axis;
raising said unloaded support member from said 035480730 endless conveyor; and
transporting said unloaded support member along said first predetermined directional axis to said starting position.